US007956299B2

(12) United States Patent
Shimada et al.

(10) Patent No.: US 7,956,299 B2
(45) Date of Patent: Jun. 7, 2011

(54) INHIBITOR SWITCH FOR AUTOMATIC TRANSMISSION

(75) Inventors: Hiroyuki Shimada, Tokyo (JP); Tsutomu Watada, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 408 days.

(21) Appl. No.: 12/230,654

(22) Filed: Sep. 3, 2008

(65) Prior Publication Data
US 2009/0065332 A1   Mar. 12, 2009

(30) Foreign Application Priority Data
Sep. 6, 2007 (JP) .................. P2007-232006

(51) Int. Cl.
*H01H 19/00* (2006.01)
(52) U.S. Cl. .................. 200/6 R; 200/11 A
(58) Field of Classification Search .............. 200/6 R, 200/11 A, 571
See application file for complete search history.

(56) References Cited

U.S. PATENT DOCUMENTS

| 5,736,701 A | | 4/1998 | O'Brien et al. |
| 5,743,380 A | * | 4/1998 | Gauker ...................... 200/43.08 |
| 5,977,496 A | * | 11/1999 | Halberg et al. ............ 200/61.88 |

* cited by examiner

*Primary Examiner* — Renee S Luebke
*Assistant Examiner* — Lisa Klaus
(74) *Attorney, Agent, or Firm* — Rader, Fishman & Grauer PLLC

(57) ABSTRACT

A movable contact board is engaged to a detent plate fixed and fastened to a manual shaft and a shaft support portion for supporting the manual shaft which is a turning center of the detent plate to the stationary contact board is formed integrally with the movable contact board. Therefore, the detent plate, the manual shaft and the movable contact board cooperate integrally, leading to an improvement on relative position accuracy of the movable contact board to the stationary contact board.

10 Claims, 3 Drawing Sheets

INHIBITOR SWITCH FOR AUTOMATIC TRANSMISSION

CROSS-REFERENCE TO RELATED APPLICATION

This application claims priority under 35 USC 119 from Japanese Patent Application No. 2007-232006, the disclosure of which is incorporated by reference herein.

BACKGROUND OF THE INVENTION

1. Field of the Invention

The present invention relates to an inhibitor switch for detecting a shift range point of an automatic transmission, and particularly to an inhibitor switch for an automatic transmission which can significantly improve relative position accuracy of a movable contact board to a stationary contact board.

2. Description of Related Art

U.S. Pat. No. 5,736,701 conventionally proposes an inhibitor switch for detecting a select position of a shift range selector such as a selector lever in an automatic transmission in which a manual valve operates in accordance with the select position of the shift range selector, thereby switching a shift range point.

The inhibitor switch 101 in U.S. Pat. No. 5,736,701 is, as shown in FIG. 3, configured so that a metallic detent plate 103 moving depending on a select position of the select lever and an insulative, plastic stationary contact board 105 are arranged to be as opposed to each other while permitting relative rotation with each other around a manual shaft 107 which is a common shaft of the detent lever 103 and the contact board 105.

An insulative, plastic movable contact board 109 is attached to the detent plate 103. The movable contact board 109 is provided with a plurality of movable contact points 111. For attaching the movable contact board 109 to the detent plate 103, for example, four plastic boss portions 115 which are attached on the movable contact board 109 to extend vertically therefrom are fitted into, for example, four through bores 113 formed to penetrate through the detent plate 103, which are attached by fastening means such as heat caulking or press fitting.

On the other hand, in the stationary contact board 105, a plurality of stationary contact points 117 are provided on one side surface thereof facing the movable contact board 109 by, for example, insert molding.

SUMMARY OF THE INVENTION

The present invention is made in view of the foregoing problems and it is an object of the present invention to provide an inhibitor switch for an automatic transmission which can significantly improve relative position accuracy of a movable contact board to a stationary contact board.

According to an aspect of the present invention, an inhibitor switch for an automatic transmission is configured as follows. A metallic detent plate moving depending on a select position of a select lever for an automatic transmission and an insulative, plastic stationary contact board are arranged to be as opposed to each other while permitting relative rotation with each other around a common shaft. The stationary contact board is provided with metallic stationary contact points and on the other hand, the detent plate is engaged to an insulative, plastic movable contact board. The movable contact board is provided with metallic movable contact points at positions facing the stationary contact points to slide on the stationary contact points. The stationary contact board rotatably supports the common shaft at the shaft support portion and the detent plate is fixed to the common shaft. By detecting a change of an electrical connection pattern in accordance with a sliding position of the movable contact point to the stationary contact point when the detent plate rotates with rotation of the common shaft, a shift range position for the automatic transmission is detected. The movable contact board is provided with a shaft support portion for supporting the common shaft and also with boss portions extending toward the detent plate. The detent plate is provided with through bores engaged to the boss portions and the through bore is formed as an elongated bore extending along a radial direction of the common shaft. A dimension of the through bore in a direction of the shaft circumference is sized to have a regulation dimension equivalent to an outer dimension of the boss portion. An engagement of the movable contact board to the detent plate is realized by fitting the boss portion to the through bore.

ADVANTAGE OF THE INVENTION

In the conventional art, the position deviation in the shaft circumference direction is generated by accumulation of at least, a deviation amount generated at the time of fixing and fastening the detent plate to the shaft and a deviation amount generated at the time of directly attaching the movable contact board to the detent plate. Therefore, it is difficult to improve such relative position accuracy, which causes deterioration of a yield ratio, as well as a disadvantage in costs.

On the other hand, in the inhibitor switch for the automatic transmission according to the aspect of the present invention, the movable contact board is connected to the detent plate fixed to the shaft and is provided with a shaft support portion for supporting the shaft as well as boss portions extending toward the detent plate. Further, the detent plate is provided with through bores engaged to the boss portions and the through bore is formed as an elongated bore extending along a radial direction of the common shaft. A dimension of the through bore in a direction of the shaft circumference is sized to have a regulation dimension equivalent to an outer dimension of the boss portion. An engagement of the movable contact board to the detent plate is realized by fitting the boss portion to the through bore. As a result, since the detent plate, the shaft and the movable contact board cooperate integrally, it is possible to restrict the accumulation error of the respective position deviations of the movable contact board in the shaft radial direction and the shaft circumference direction.

That is, when the present invention and the conventional art are compared in regard to a relative position accuracy of the movable contact board to the stationary contact board in the circumferential direction in a case where the movable contact board having the movable contact points are attached to deviate by the same angle in the circumferential direction (shaft circumference direction) in the present invention and the conventional art, the relative position accuracy of the inhibitor switch (refer to FIG. 1) in the present invention improves as compared to the conventional art (refer to FIG. 3).

In detail, in a case of inserting the plural boss portions in the movable contact board to the corresponding through bores in the detent plate (which are attached to the rotational shaft for rotation), which are attached to each other by heat fastening or the like, it is general that one of the plural boss portions in the movable contact board is used as the boss portion for positioning and the rest of the boss portions is used as boss portions for fixing.

Here, a dimension tolerance of each of the boss portion in the movable contact board for positioning and the through bore into which the boss portion penetrates is tight and a dimension tolerance of each of the boss portion in the movable contact board for fixing and the through bore into which the boss portion penetrates is less tight than the above dimension tolerance.

Since the boss portion 115 in the movable contact board 109 is inserted into the through bore 113 in the detent plate 103 and is attached thereto by heat fastening or the like in the conventional art (refer to FIG. 3), the movable contact board 109 deviates by a manufacturing variation amount of the boss portion in the movable contact board 109 for fixing centering around the boss portion in the movable contact board 109 for positioning to the detent plate 103.

On the other hand, in the inhibitor switch according to the aspect of the present invention (refer to FIG. 1), the shaft support portion 67 of the movable contact board 59 is fixed to the shaft 49, and the boss portion 61 in the movable contact board 59 is inserted into the through bore 45 of the detent plate 17 and attached thereto by heat fastening or the like. Therefore, the movable contact board 59 deviates by a manufacturing variation amount of the boss portion in the movable contact board 59 for fixing centering around the shaft 49 as in the case of the conventional art. In this case, a distance between the shaft 49 and the boss portion in the movable contact board 59 for fixing to the detent plate 17 is longer than a distance between the boss portion in the movable contact board 109 for positioning and the boss portion in the movable contact board 109 for fixing in the conventional art. Therefore, a deviation amount of the movable contact board 59 to the stationary contact board 15 in the circumferential direction is made smaller than that of the conventional art due to a relation of a lever ratio, thus improving the relative position accuracy.

Further, the through bore is formed as an elongated bore extending along a radial direction of the shaft and a dimension of the through bore in the shaft circumference direction is configured to have the regulation dimension equivalent to the outer dimension of the boss portion. Therefore, when the movable contact board is engaged to the detent plate, the elongated bore serves to absorb the position deviation in the shaft radial direction and the regulation dimension serves to improve the position accuracy in the shaft circumference direction. In consequence, an improvement on the relative position accuracy of the movable contact board to the stationary contact board can be realized and also an improvement on the manufacturing efficiency and an advantage in costs can be realized.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE EXAMPLE EMBODIMENTS

Embodiment

Hereinafter, an inhibitor switch for an automatic transmission according to an embodiment of the present invention will be explained with reference to the drawings.

[Schematic Arrangement in the Circumference of an Inhibitor Switch for an Automatic Transmission]

Figure 1:
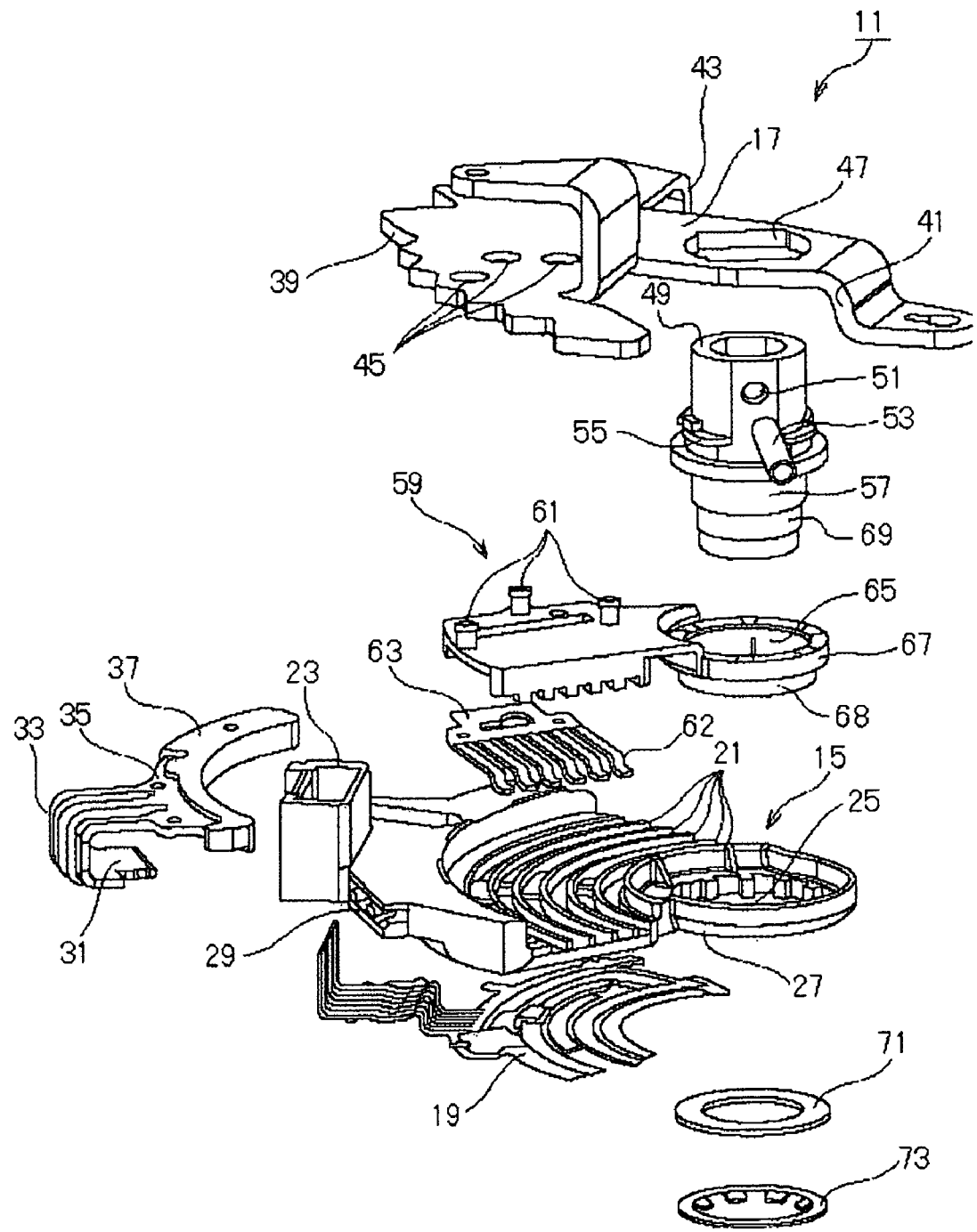
FIG. 1 is an exploded perspective view showing a schematic arrangement in an inhibitor switch for an automatic transmission in an embodiment of the present invention.
Figure 2:
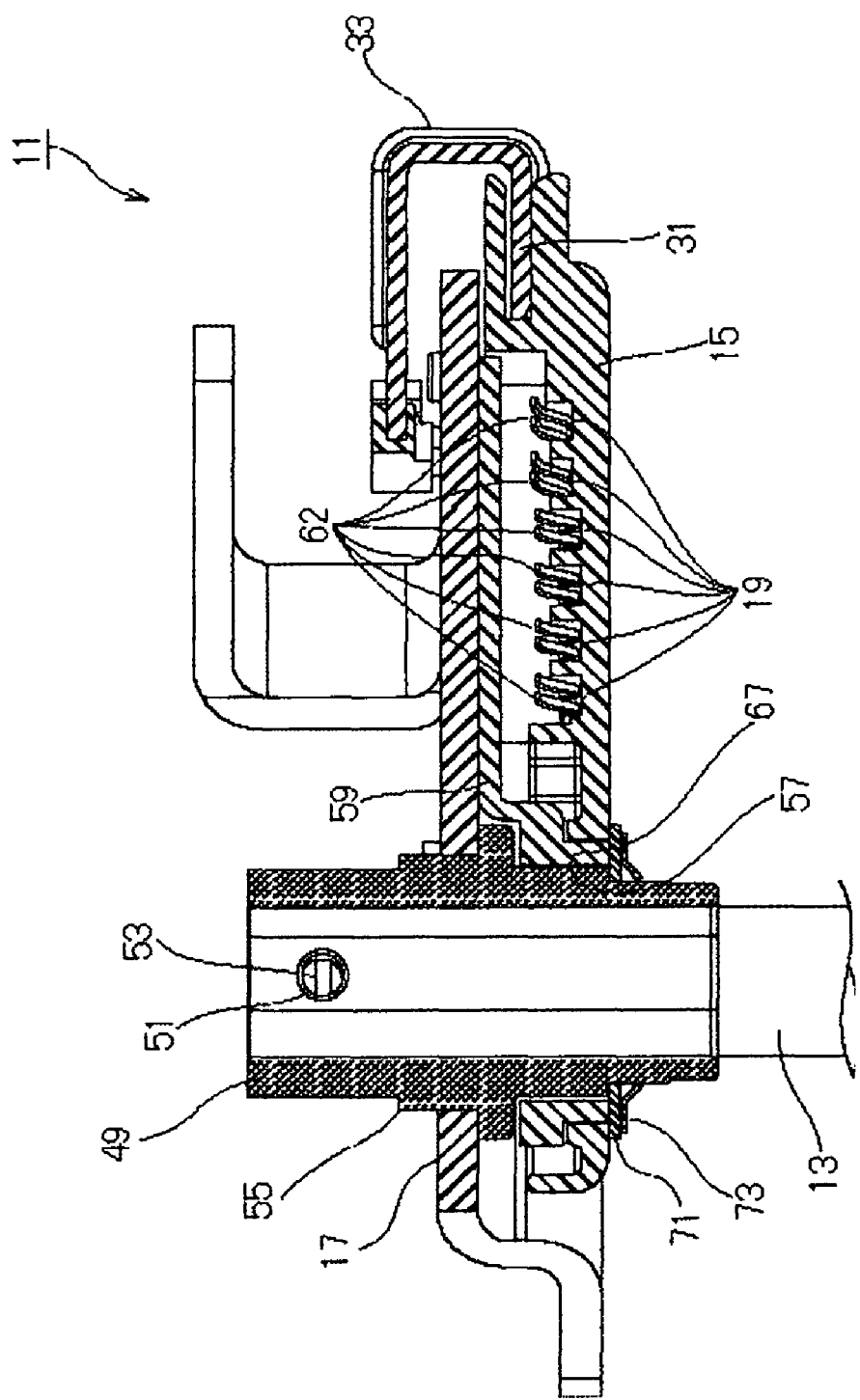
FIG. 2 is a partial cross section showing the inhibitor switch for the automatic transmission in the embodiment of the present invention.

FIG. 1 is an exploded perspective view showing a schematic arrangement in an inhibitor switch for an automatic transmission in an embodiment of the present invention and FIG. 2 is a partial cross section showing the inhibitor switch for the automatic transmission in the embodiment of the present invention. It should be noted that an illustration of a manual shaft is omitted in FIG. 1.

As shown in FIGS. 1 and 2, an inhibitor switch 11 is connected to a manual shaft 13 in a transmission casing (not shown). In detail, the inhibitor switch 11 is configured so that a metallic detent plate 17 moving depending on a select position of a select lever for an automatic transmission and an insulative, plastic stationary contact board 15 are arranged to be as opposed to each other while permitting relative rotation with each other around the manual shaft 13 which is a common shaft of the detent plate 17 and the stationary contact board 15.

A plurality of metallic stationary contact points 19 formed to be arrayed in a generally fan-shape along a diameter direction are provided integrally with the stationary contact board 15 by insert molding. As the same with the stationary contact boards 15, a plurality of plastic ribs 21 formed to be arrayed in a generally fan-shape along a diameter direction are provided in the stationary contact board 15 to extend vertically therefrom. The ribs 21 are to guide movable contact points 62 provided in the movable contact board 59 along a diameter direction of the stationary contact board 15, which will be described later, and also prevent an electrical shortcut attributable to foreign matters such as dusts attached to the stationary contact points 19 adjacent to each other. The stationary contact board 15 is provided with a connector 23 for electrical connection with an outside thereof. The stationary contact board 15 is provided with a shaft support portion 27 integral therewith having a through bore 25 for supporting the manual shaft 13 (including a cylindrical member to be described later). Further, a metallic guide member 33 is attached to the stationary contact board 15 as a result of inserting an insert portion 31 in the guide member 33 into an engaging portion 29 in the outer periphery of the stationary contact board 15. The guide member 33 has a folded portion 35 folded in a direction of the manual shaft 13, having a cross section formed in a generally C-letter shape. The folded portion 35 has a generally entire surface at an end of the folding side covered with a plastic cover 37. The plastic cover 37 is provided to cover one side surface of the detent plate 17.

The detent plate 17 serves to convey a detent feeling to a user at the time of switching the inhibitor switch 11. Therefore, the detent plate 17 is provided with a wave-shaped portion 39 in the outer periphery of the detent plate 17. When the roller spring (not shown) is engaged resiliently to the detent plate 17 while going over the wave-shaped portion 39, the detent feeling can be conveyed to a user at the time of switching. In the detent plate 17, by bending a part thereof generally vertically from one end surface, first and second regulation portions 41 and 43 are formed. The first and second regulation portions 41 and 43 serve to regulate turning of the detent plate 17 to the stationary contact board 15 within a detection region of an electrical connection pattern between the stationary contact point 19 and the movable contact point 62 to be described later due to a collision function with the stationary contact board 15. The detent plate 17 is provided with three through bores 45 formed to penetrate therein for engaging to the movable contact board 59 to be described later. It should be noted that the through bore 45 is formed as an elongated bore extending along the shaft radial direction in the manual shaft 13 and a dimension in the shaft circumferential direction thereof is formed so as to be equal to an outer dimension of each of boss portions 61 to be described later. Further, the detent plate 17 is provided with a through bore 47 formed to penetrate therethrough for fastening and fixing the manual shaft 13 by appropriate means such as caulking or fixing.

For fastening and fixing the detent plate 17 to the manual shaft 13, for example, a plastic or metallic cylindrical member 49 surrounding the manual shaft 13 is engaged to the manual shaft 13. The cylindrical member 49 has a side wall provided with a through bore 51 formed to penetrate therethrough. For engaging the cylindrical member 49 to the manual shaft 13, at a state where the through bore 51 provided with the side wall of the cylindrical member 49 formed to penetrate therethrough and a through bore (not shown) provided with a side wall of the manual shaft 13 formed to penetrate therethrough are positioned to overlap with each other, a pin 53 is adapted to press-fit in the through bore 51. Further, the cylindrical member 49 is provided with an expanding portion 55 formed at the side wall thereof. The through bore 47 formed to penetrate through the detent plate 17 is press-fitted in the expanding portion 55 so that the detent plate 17 is fastened and fixed to the cylindrical member 49. The cylindrical member 49 is provided with a first attachment portion 57 at the side wall thereof. The through bore 65 in the movable contact board 59 to be described next is press-fitted in the first attachment portion 57 and thereby, the movable contact board 59 is fastened and fixed to the cylindrical member 49.

For detecting a turning position of the detent plate 17 to the stationary contact board 15, the insulative, plastic movable contact board 59 is provided to engage to the detent plate 17. This engagement is realized by, for example, inserting and press-fitting the three boss portions 61 integral with the movable contact board 59 to extend vertically therefrom into the through bores 45 formed to penetrate through the detent plate 17. Further, the through bore 45 is formed as an elongated bore extending along a radial direction of the manual shaft 13 and a dimension in the shaft circumference direction is configured to have the regulation dimension equivalent to the outer dimension of the boss portion 61 to be described later. Therefore, when the movable contact board 59 is engaged to the detent plate 17, the elongated bore serves to absorb the position deviation in the shaft radial direction in the manual shaft 13 and the regulation dimension serves to improve the position accuracy in the shaft circumference direction. A movable contact point unit 63 having a plurality of movable contact points 62 is attached to the movable contact board 59 at the base by appropriate means such as riveting, caulking, press-fitting or insert molding. The shaft support portion 67 having the through bore 65 for supporting the manual shaft 13 (cylindrical member 49) is formed integrally with the movable contact board 59. By press-fitting the first attachment portion 57 into the through bore 65 in the movable contact board 59, the movable contact board 59 is fastened and fixed to the cylindrical member 49. Further, after attaching the movable contact board 59 to the cylindrical member 49, when the stationary contact board 15 is inserted into the attachment portion 68 in the shaft support portion 67 so that the through bore 25 formed to penetrate through the shaft support portion 27 has an internal contact with an outer wall in the attachment portion 68, the stationary contact board 15 is attached to the attachment portion 68 in the shaft support portion 67 of the movable contact board 59 to be capable of turning around the attachment portion 68.

Incidentally, in a case of adopting metal as a material of the cylindrical member 49, the plastic movable contact board 59 is fastened and fixed to the metallic cylindrical member 49 through an engagement of metal-to-plastic. In addition, in a case of adopting plastic as a material of the cylindrical member 49, the plastic movable contact board 59 is fastened and fixed to the plastic cylindrical member 49 through an engagement of plastic-to-plastic, for example, by press-fitting or the like.

The plastic stationary contact board 15 is attached to the attachment portion 68 in the shaft support portion 67 of the plastic movable contact board 59 so as to be capable of turning through an engagement state of plastic-to-plastic. Here, for example, even if the plastic materials differ with each other in an engagement state of plastic-to-plastic, a linear expansion coefficient of each plastic material due to a change in an atmospheric temperature of the inhibitor switch 11 can be assumed as being generally equal as compared to a case of the engagement state of metal-to-plastic. Therefore, for example, even if the atmospheric temperature rapidly changes, the looseness due to a dimension difference between the cylindrical member 49, the movable contact board 59 and the stationary contact board 15 as the attached members can be restricted as soon as quickly, and each relative position accuracy in the shaft radial direction and in the shaft circumferential direction of the movable contact board to the stationary contact board can be remarkably improved.

Yet, for rigidly fastening and fixing the movable contact board 59 to the cylindrical member 49 and also, for preventing the stationary contact board 15 from falling down from the movable contact board 59, after the movable contact board 59 is press-fitted into the cylindrical member 49 and the movable contact board 59 is attached to the cylindrical member 49, the through bore 25 in the stationary contact board 15 is rotatably inserted into the attachment portion 68 of the movable contact board 59 and after that, a stopper ring 73 is arranged to be attached through a metallic washer 71 to a second attachment portion 69 in the cylindrical member 49.

[Explanation for an Operation of an Inhibitor Switch for an Automatic Transmission]

According to the inhibitor switch 11 as arranged above, when the manual shaft 13 and the detent plate 17 rotate by a gear shift operation of a user, a resilient contact position of the roller spring relative to the wave-shaped portion 39 in the detent plate 17 is changed. In consequence, the rotational position of the manual shaft 13 can be positioned at the changed resilient position and the gear shift position of the automatic transmission can be also positioned.

When a user operates a shift lever to perform a gear shift operation, the detent plate 17 is driven in association with the gear shift operation and the detent plate 17 and the manual shaft 13 rotate integrally. In consequence, a manual valve is operated, making it possible to perform a gear shift for the automatic transmission.

When the operation of the shift lever is completed and each rotation of the manual shaft 13 and the detent plate 17 is stopped, a rotational position of the manual shaft 13 is detected based upon a change of an electrical connection pattern in accordance with a sliding position of the movable contact point 62 to the stationary contact point 19. Thereby, a gear shift position of the automatic transmission can be detected.

Advantage of Embodiment

In the conventional art, the position deviation in the shaft circumference direction is generated by accumulation of at least, a deviation amount generated at the time of fixing and fastening the detent plate to the shaft and a deviation amount generated at the time of directly attaching the movable contact board to the detent plate. Therefore, it is difficult to improve the relative position accuracy, which causes deterioration of a manufacturing efficiency, as well as a disadvantage in costs.

On the other hand, in the inhibitor switch for the automatic transmission according to the present embodiment, the movable contact board 59 is connected to the detent plate 17 which is fastened and fixed to the manual shaft 13 (including the cylindrical member 49, the same hereinafter), and the movable contact board 59 is integral with the shaft support portion 67 for supporting the manual shaft 13 which is a turning center of the detent plate 17 to the stationary contact board 15. As a result, since the detent plate 17, the manual shaft 13 and the movable contact board 59 cooperate integrally, it is possible to restrict the accumulation error in relation to the position deviations of the movable contact board 59 in the shaft radial direction and the shaft circumference direction.

Figure 3:
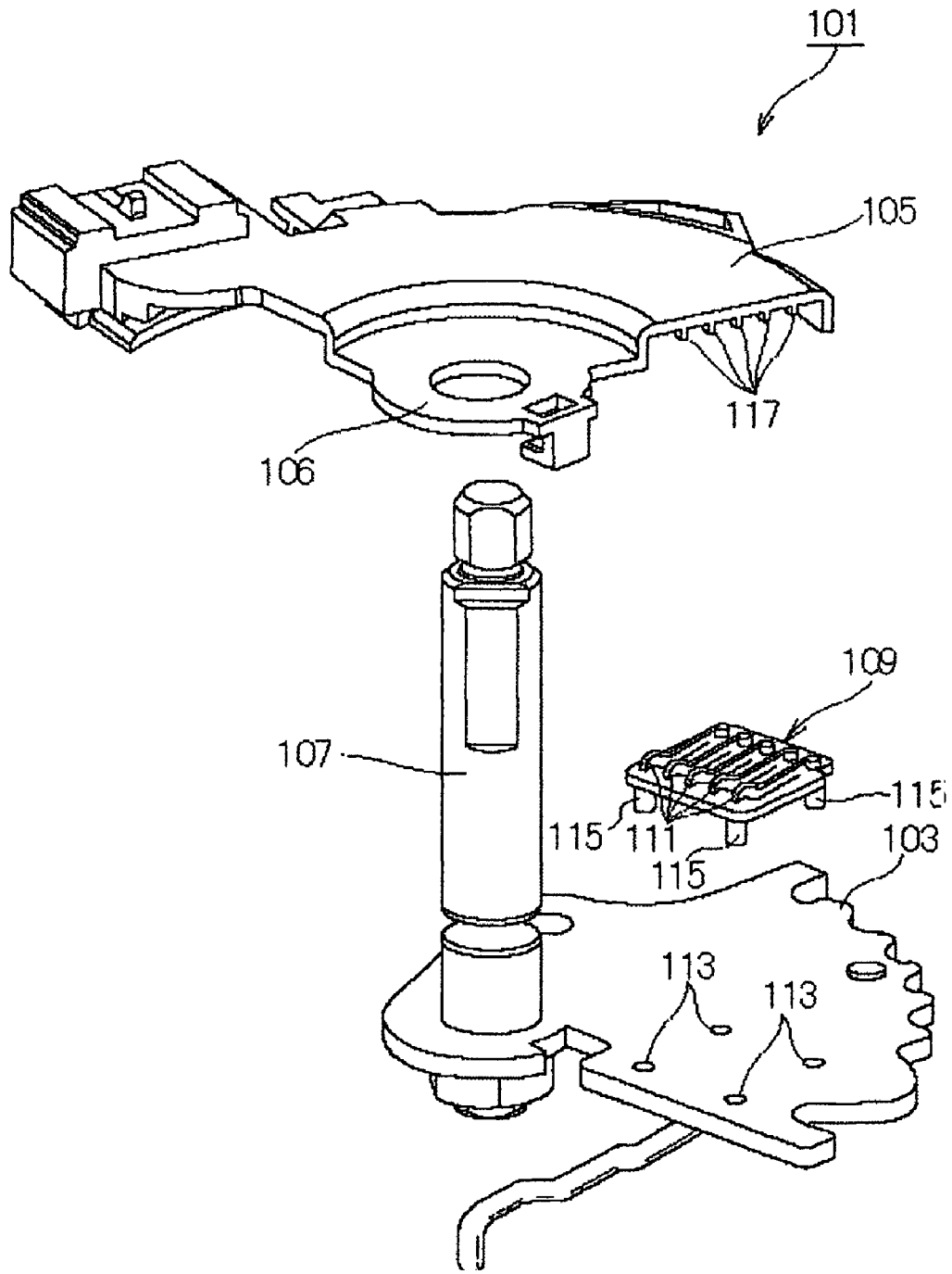
FIG. 3 is an exploded perspective view showing a schematic arrangement in an inhibitor switch for an automatic transmission in the conventional art.

That is, when the present embodiment and the conventional art are compared in regard to a relative position accuracy of the movable contact board to the stationary contact board in the circumferential direction in a case where the movable contact board having the movable contact points are attached to deviate by the same angle in the circumferential direction (shaft circumference direction) in the present embodiment and the conventional art, the relative position accuracy of the inhibitor switch (refer to FIG. 1) in the present embodiment improves as compared to the conventional art (refer to FIG. 3).

In detail, it is general that in a case of inserting the plural boss portions in the movable contact board into the corresponding through bores in the detent plate (which is attached to the rotational shaft for rotation), which are attached to each other by heat caulking or the like, one of the plural boss portions in the movable contact board is used as the boss portion for positioning and the rest of the boss portions is used as boss portions for fixing.

Here, a dimension tolerance of each of the boss portion in the movable contact board for positioning and the through bore into which the boss portion penetrates is tight and a dimension tolerance of each of the boss portion in the movable contact board for fixing and the through bore into which the boss portion penetrates is less tight than the above dimension tolerance.

Since the boss portion 115 in the movable contact board 109 is inserted into the through bore 113 in the detent plate 103 and the boss portion 115 is attached to the through bore 113 by heat fastening or the like in the conventional art (refer to FIG. 3), the movable contact board 109 deviates by a manufacturing variation amount of the boss portion in the movable contact board 109 for fixing centering around the boss portion in the movable contact board 109 for positioning to the detent plate 103.

On the other hand, in the inhibitor switch according to the present invention (refer to FIG. 1), the support portion 67 of the movable contact board 59 is fixed to the shaft 49, and the boss portion 61 in the movable contact board 59 is inserted into the through bore 45 of the detent plate 17 and attached thereto by heat caulking or the like. Therefore, the movable contact board 59 deviates by a manufacturing variation amount of the boss portion in the movable contact board 59 for fixing around the shaft 49 as in the case of the conventional art. In this case, a distance between the shaft 49 and the boss portion in the movable contact board 59 for fixing to the detent plate 17 is longer than a distance between the boss portion in the movable contact board 109 for positioning and the boss portion in the movable contact board 109 for fixing in the conventional art. Therefore, a deviation amount of the movable contact board 59 to the stationary contact boars 15 in the circumferential direction is made smaller that that of the conventional art, due to a relation of a lever ratio, thus improving the relative position accuracy.

Further, the through bore 45 is formed as an elongated bore extending along a radial direction of the shaft and a dimension in the shaft circumference direction is configured to have the regulation dimension equivalent to the outer dimension of the boss portion 61. Therefore, when the movable contact board 59 is engaged to the detent plate 17, the elongated bore serves to absorb the position deviation in the shaft radial direction and the regulation dimension serves to improve the position accuracy in the shaft circumference direction. In consequence, a remarkable improvement on the relative position accuracy of the movable contact board 59 to the stationary contact board 15 can be realized and also an improvement on the manufacturing efficiency and an advantage in costs can be realized.

In the inhibitor switch 11 according to the aspect of the present invention, when the detent plate 17 excessively turns in an assembled state thereof, the first and second regulation portions 41 and 43 integral with the detent plate 17 collide with the stationary contact board 15. This collision serves to regulate the turning of the detent plate 17 to the stationary contact board 15 within the detection region of the electrical connection pattern between the stationary contact point 19 and the movable contact point 62. Therefore, this construction results in no need for regulation means such as another stopper, thus contributing to reduction in the number of components, as well as acquiring an advantage in costs.

Further, in the inhibitor switch according to the aspect of the present invention, the guide member 33 is attached through an engagement portion 29 in the outer periphery of the stationary contact board 15 to cover one side surface of the detent plate 17. Therefore, the guide member 33 can restrict an axial movement of the detent plate 17 to eliminate the axial looseness of the detent plate 17. In addition, since the metallic guide member 33 is adopted, as compared to a case of adopting a plastic guide member (conventional art), even if the inhibitor switch 11 according to the aspect of the present invention is exposed to a high-temperature atmosphere, the guide member 33 does not nearly deform. Therefore, a high looseness-prevention effect can be realized. Further, the guide member 33 is configured by bending one metallic sheet of any appropriate shape to be in a C-letter shape and has one end easily attachable to the stationary contact board 15 in an insert way. In consequence, the attachment man-hour can be cut down. Further, since the guide member 33 has a folding side end an entire surface of which is covered with the plastic cover 37, a contact state between the guide member 33 and the detent plate 17 is a plastic-to-metal contact state. In consequence, as compared to a case of a contact state of metal-to-metal, defects such as occurrence of strange sounds or scratches by friction can be restricted beforehand.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

DESCRIPTION OF THE CODES

11: Inhibitor switch
13: Manual shaft
15: Stationary contact board
17: Detent plate
19: Stationary contact point
33: Guide member
41: First regulation member
43: Second regulation portion
45: Through bore (elongated bore and formed in a regulated dimension)
49: Cylindrical member (shaft)
59: Movable contact board
61: Boss portion
62: Movable contact point

What is claimed is:

1. An inhibitor switch for an automatic transmission comprising:
   an insulative, plastic stationary contact board;
   a metallic detent plate moving depending on a select position of a select lever for an automatic transmission, wherein the stationary contact board and the detent plate are arranged to be opposed to each other while permitting relative rotation with each other around a common shaft, and the stationary contact board is provided with metallic stationary contact points; and
   an insulative, plastic movable contact board engaged to the detent plate, wherein the movable contact board is provided with metallic movable contact points at positions facing the stationary contact points to slide on the stationary contact points, wherein the stationary contact board rotatably supports the common shaft at a shaft support portion, the detent plate is fixed to the common shaft, and by detecting a change of an electrical connection pattern in accordance with a sliding position of the movable contact point to the stationary contact point when the detent plate rotates with rotation of the common shaft, a shift range position for the automatic transmission is detected, wherein:
   the movable contact board is provided with a shaft support portion for supporting the common shaft and also with boss portions extending toward the detent plate;
   the detent plate is provided with through bores engaged to the boss portions and the through bore is formed as an elongated bore extending along a radial direction of the common shaft;
   a dimension of the through bore in a direction of the shaft circumference is configured to have a regulation dimension equivalent to an outer dimension of the boss portion; and
   an engagement of the movable contact board to the detent plate is realized by fitting the boss portion to the through bore.

2. An inhibitor switch for an automatic transmission according to claim 1, wherein:
   the detent plate is provided with a regulation portion for regulating turning of the detent plate to the stationary contact board.

3. An inhibitor switch for an automatic transmission according to claim 2, wherein:
   the stationary contact board is provided with a guide member formed at the outer periphery to cover a side surface of the detent plate different from an engagement side of the movable contact board, the guide member having a cross section of a generally C-letter shape and including a folded portion folded in the shaft direction.

4. An inhibitor switch for an automatic transmission according to claim 2, wherein:
   the shaft support portion of the plastic stationary contact board is rotatably attached through an engagement state of plastic-to-plastic to a shaft support portion in the plastic movable contact board.

5. An inhibitor switch for an automatic transmission according to claim 1, wherein:
   the detent plate is provided with a pair of regulation portions extending vertically from the detent plate for regulating turning of the detent plate to the stationary contact board within a detection region of the electrical connection pattern.

6. An inhibitor switch for an automatic transmission according to claim 5, wherein:
   the stationary contact board is provided with a guide member formed at the outer periphery to cover a side surface of the detent plate different from an engagement side of the movable contact board, the guide member having a cross section of a generally C-letter shape and including a folded portion folded in the shaft direction.

7. An inhibitor switch for an automatic transmission according to claim 5, wherein:
   a shaft support portion of the plastic stationary contact board is rotatably attached through an engagement state of plastic-to-plastic to a shaft support portion in the plastic movable contact board.

8. An inhibitor switch for an automatic transmission according to claim 1, wherein:
   the stationary contact board is provided with a guide member formed at the outer periphery to cover a side surface of the detent plate different from an engagement side of the movable contact board, the guide member having a cross section of a generally C-letter shape and including a folded portion folded in the shaft direction.

9. An inhibitor switch for an automatic transmission according to claim 8, wherein:
   a shaft support portion of the plastic stationary contact board is rotatably attached through an engagement state of plastic-to-plastic to a shaft support portion in the plastic movable contact board.

10. An inhibitor switch for an automatic transmission according to claim 1, wherein:
    a shaft support portion of the plastic stationary contact board is rotatably attached through an engagement state of plastic-to-plastic to a shaft support portion in the plastic movable contact board.

* * * * *